United States Patent [19]

Chauvin et al.

[11] Patent Number: 5,718,788
[45] Date of Patent: Feb. 17, 1998

[54] PROCESS AND COMPOSITION FOR THE USE OF SUBSTITUTED MELAMINES AS HARDENERS OF NOVOLA RESINS

[75] Inventors: Brigitte Marie Chauvin, Chamalieres; Olivier Durel, Blanzat, both of France

[73] Assignee: Compagnie Generale Establissements Michelin - Michelin & Cie, Clermont-Ferrand Cedex, France

[21] Appl. No.: 657,588

[22] Filed: Jun. 7, 1996

Related U.S. Application Data

[62] Division of Ser. No. 373,306, filed as PCT/EP93/01747, Jun. 7, 1993.

[30] Foreign Application Priority Data

Jul. 8, 1992 [FR] France .................... 92/08571

[51] Int. Cl.⁶ .............. B29C 35/92; B32B 31/20
[52] U.S. Cl. ..................... 156/110.1; 156/537
[58] Field of Search ................ 156/110.1, 537

[56] References Cited

U.S. PATENT DOCUMENTS

| | | | |
|---|---|---|---|
| 4,465,807 | 8/1984 | Giller et al. | 524/311 |
| 4,542,186 | 9/1985 | Giller et al. | 524/511 |
| 4,699,832 | 10/1987 | Sattelmeyer | 524/511 |
| 4,947,916 | 8/1990 | Ishikawa et al. | 152/537 |

FOREIGN PATENT DOCUMENTS

| | | | |
|---|---|---|---|
| 0473948 | 3/1992 | European Pat. Off. | 524/100 |
| 0545445 | 6/1993 | European Pat. Off. . | |
| 0232445 | 10/1987 | Japan | 524/100 |
| 0740798 | 6/1980 | Russian Federation | 528/145 |

*Primary Examiner*—Peter A. Szekely
*Attorney, Agent, or Firm*—Baker & Botts, LLP

[57] ABSTRACT

A process for hardening a composition and a hardenable composition, in which there are used:
  at least one novolac resin;
  at least one hardener of the resin, selected from the group consisting of substituted melamines;
  at least one compound comprising at least one

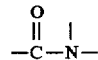

group, this compound being without methylol group and ether group corresponding to methylol, and/or at least one reagent capable of giving such a compound under the conditions of the hardening.

The hardening of the resin is caused by the action of heat.

13 Claims, 5 Drawing Sheets

PROCESS AND COMPOSITION FOR THE USE OF SUBSTITUTED MELAMINES AS HARDENERS OF NOVOLA RESINS

The present application is a divisional of application Ser. No. 08/373,306, filed as PCT/EP93/01747 Jun. 7, 1993 abn.

The present invention relates to novolac resins and, more particularly, to systems which permit the hardening of these resins.

By "novolac resins", as is known, there is understood a precondensate having a base of at least one phenol, or a phenol derivative, and at least one aldehyde.

Such resins are used, for example, in rubber preparation and, in particular, in the rubber preparations which serve for the production of different articles, in particular belts, tubes and tires, as described, for example, in U.S. Pat. No. 5,021,522. It is known that the use of these resins associated with hardeners makes it possible to reinforce the rubber preparations by contributing hardness and high modules with low deformations to the mixes after curing. In accordance with the prior art, the reinforcement by this type of resin is explained by the formation within the rubber of a three-dimensional network obtained by reaction of the novolac resin with the hardener, which is generally a methylene donor.

The methylene donor which is most used for cross-linking the novolac resins is hexamethylene tetramine (HTA). However, HMTA has the following drawbacks:

it raises problems of health and safety as noted in the article "Rubber/metal adhesion; RFS systems: HMT or HMMM?", by Ph. Combette and F. Alarcon-Lorca, in Caoutchoucs et Plastiques, No. 683, December 1988, pp. 103 to 107;

when novolac resins are used with HMTA in the presence of rubbers intended to adhere to metal reinforcements, deterioration of this bond may take place, probably as a result of the liberation of ammonia, as described in the article entitled "Adherence of steel cables in tires" by Klaus-Dieter Albrecht and Theo Kempermann, Inform. Bayer pour l'Ind. Caoutch., No. 53, 1981, pp. 13–25.

In order to avoid these drawbacks, it has been attempted to replace HMTA as hardener by another methylene donor, hexa(methoxymethyl)melamine (H3M), as indicated in the two above-mentioned articles, which presents fewer drawbacks as a result of a liberation of methanol instead of ammonia upon the curing of the rubber. However, the use of H3M has the major industrial drawback of considerably delaying the stiffening speed of compositions containing sulfur-curing rubbers, as described in the bulletin "ARAX EKM" of Enichem Synthesis.

The object of the present invention is to propose a process and a composition of resins Which make it possible to use substituted melamines as hardeners of novolac resins, while imparting a high speed of stiffening of the compositions containing these resins and a high level of mechanical properties, without presenting any problems as to health.

The process of the invention for hardening a composition containing at least one novolac resin is characterized by the use, mixed with the novolac resin or resins, of a) at least one hardener selected from the group formed of the substituted melamines;

b) at least one compound having at least one

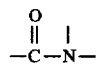

group, this compound being without either methylol group or ether group corresponding to methylol, so that it is not an aminoplast, and/or at least one reagent capable of giving such a compound under the hardening conditions;

and by the fact that the hardening of said resin or resins is brought about under the action of heat.

The invention also concerns a hardenable composition comprising, in mixture with at least one novolac resin, the said hardener or hardeners a) and the said compound or compounds b), and/or the reagent or reagents capable of giving these compounds, under the conditions of the hardening.

The novolac resins consist of all resins produced by condensing at least one phenol compound, selected from the group consisting of phenol and phenol derivatives, with at least one aldehyde.

The phenol derivatives used in accordance with the invention may comprise one or more aromatic rings and/or one or more phenol functions. Such derivatives may furthermore comprise chemical groups other than phenol groups, for example alkyl, alkenyl, alkynyl, amine, alkoxy and ester groups. Such derivatives are, for instance, meta-aminophenol, meta-methoxyphenol and β-naphthol.

The aldehydes used in accordance with the invention comprise at least one aldehyde function. These aldehydes may be aliphatic, cyclic or aromatic, in particular formaldehyde, acetaldehyde, propionaldehyde, butyraldehyde, crotonaldehyde, cinnamaldehyde, benzaldehyde and furfural.

Such novolac resins correspond, in particular, to the following types:

phenol/formol, modified-phenol/formol, phenol/aldehyde other than formol, phenol/formol/aldehyde other than formol, resorcinol/formol, modified-resorcinol/formol.

One of these resins or a mixture of at least two of such resins can be used.

The hardener or hardeners a) preferably have the formula:

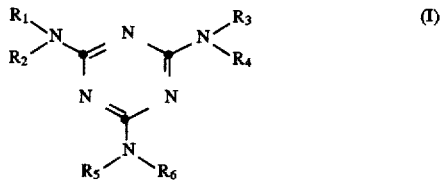

in which $R_1$, $R_2$, $R_3$, $R_4$, $R_5$ and $R_6$, which may be identical or different, are each selected preferably from the group formed of —H, —$CH_2OH$, —$CH_2OCH_3$, —$CH_2CH_2OCH_3$, at least one of the $R_1$ to $R_6$ being other than hydrogen.

Such compounds are, in particular hexa(methoxymethyl) melamine, also known as hexamethylolmelamine-hexamethylether (H3M), hexamethylolmelamine-pentamethylether, pentamethylolmelamine-pentamethylether, pentamethylolmelamine-tetramethylether, tetramethylolmelamine-tetramethylether, and trimethylolmelamine-trimethylether A single substituted melamine may be used, or a mixture of at least two substituted melamines, comprising, in particular, H3M. Such commercial mixtures have, for instance, the following names: CYREZ® 963 of American Cyanamid, COHEDUR® A of Bayer, VXT 3911 of Hoechst, XR 14117 of CECA, SUMIKANOL® 508 of Sumitomo, RESIMENE® 3520 of Monsanto, and ARAX EKM of Enichem Synthesis. These mixtures contain monomers of formula (I) and/or oligomers of monomers of formula (I). They may contain melamine.

The compounds b) comprise at least one

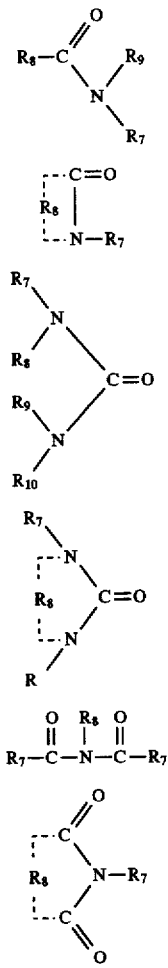

group and are without either methylol group or ether group corresponding to methylol, so that they are not aminoplasts. These compounds b) are, in particular, urea, substituted ureas, amides and imides. These compounds b) preferably have at least one of the following formulas:

in which $R_7$, $R_8$, $R_9$, $R_{10}$ are each selected preferably from the group formed of —H and saturated or unsaturated aliphatic, cyclic or aromatic hydrocarbon radicals.

$R_7$, $R_8$, $R_9$, $R_{10}$ may be identical or different, with the proviso that $R_8$ is other than —H in formulas (III), (V) and Such compounds are, for instance, formamide, acetamide, proprionamide, butyramide, caproamide, lauramide, stearamide, succinamide, urea, dimethyl urea, benzamide, benzanilide, N-cyclohexyl-proprionamide, N,N-hydroxyethyloleamide, ε-caprolactam, butyranilide, and succinimide.

A single one of these compounds or a mixture of at least two of these compounds can be used.

The compounds b) with

group can be incorporated as is in the resins or in the compositions containing these resins, or they can be formed in situ in these resins or these compositions from base chemical reagents by, for instance, the action of acids, anhydrides or acid chlorides on the amines or the corresponding amine derivatives.

If desired, mixtures containing both at least one compound b) and at least one reagent capable of giving a compound b) can also be used.

The invention can be employed in order to stiffen rubber compositions.

Such rubbers are, for instance, natural rubber, synthetic rubbers, or mixtures of at least two of such rubbers. Examples of synthetic rubbers are polyisoprene, polybutadiene, polychloroprene, polyisobutylene, styrene-butadiene copolymers, acrylonitrile-butadiene-styrene copolymers, and ethylene-propylene copolymers. These rubbers can be cross-linked, for example, under the action of sulfur, peroxides or bismaleimides with or without sulfur, or they can be without cross-linking system, such as, for instance, thermoplastic rubbers.

These compositions may contain the customary fillers and additives such as, for instance, carbon black, stearic acid, silica, silicic acid, zinc oxide, cobalt salts, sulfur or gross-linking agents, vulcanization accelerators, anti-aging agents, in particular antioxidants, oils, or various processing agents.

The fact that compound b) is not an aminoplast facilitates its incorporation and homogeneous dispersion in these rubber compositions.

The invention will be easily understood from the non-limitative examples which follow and the entirely diagrammatic figures which correspond to these examples:

I—DEFINITIONS AND TESTS

Figure 1:
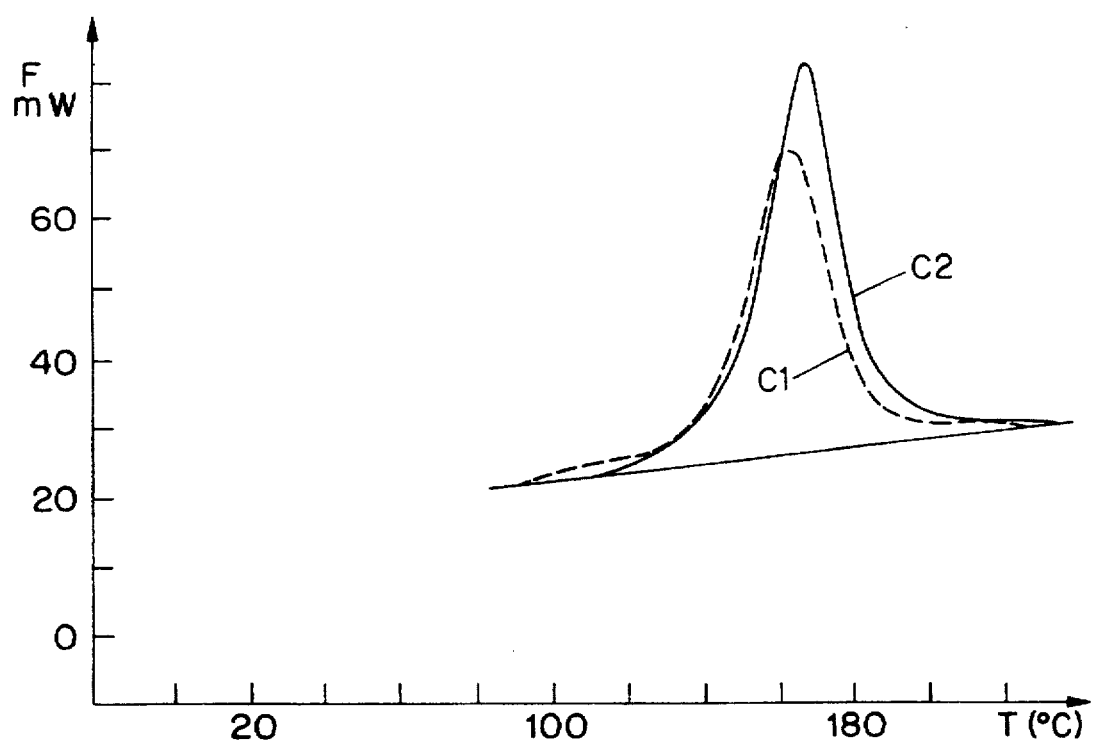
FIG. 1 shows DSC (differential scanning calorimetry) spectra for a composition according to the invention and for a composition not according to the invention.

The definitions and tests used in the examples are indicated below:

1—Rheometry

Rheometric measurements are carried out in the following two cases a) Composition containing novolac resins and rubbers without cross-linking system for them.

A conventional rheometer with oscillating biconical rotor such as described in AFNOR Standard NF-T43-015 (August 1975) is used. The development of the rheometric torque as a function of time describes the development of the hardening of the resin in the elastomeric matrix and therefore, in particular, the speed of this hardening, and the maximum rheometric torque makes it possible to describe the maximum intensity of the network of the resin, that is to say the maximum condensation yield of the resin. The diagrams are established for 150° C. and therefore make it possible to evaluate the kinetic characteristics and the hardening performance of the resins at this temperature.

b) Composition comprising novolac resins and rubbers with cross-lLinking systems for them.

The measurements are carried out in accordance with the aforesaid AFNOR Standard. The measurements are also carried out at 150° C. The development of the rheometric torque as a function of time describes the development of the stiffening of the composition as a result both of the hardening of the resin or resins and of the cross-linking of the rubber or rubbers and therefore, in particular, the speed of this stiffening, and the maximum rheometric torque makes it possible to describe the maximum stiffness of the composition at this temperature.

2—Tensile Tests

These tests make it possible to determine the elasticity stresses and the limit properties. They are carried out in accordance with AFNOR Standard NF-T46-002 of September 1988.

These tests are carried out for rubber compositions comprising possibly novolac resins, and this after curing for 50 minutes at 150° C., unless otherwise indicated.

The stresses necessary in order to obtain 10% elongation (M10), 100% elongation (M100), and 300% elongation (M300) are measured.

The stresses at break and the elongations at break are also measured. All of these tensile measurements are carried out under normal conditions of temperature and hygrometry in accordance with AFNOR Standard NF-T40-101 of December 1979.

3—Calorimetry

DSC (differential scanning calorimetry) is a technique for characterization by calorimetry which makes it possible to measure the amount of heat ΔH (enthalpy) consumed or liberated during a chemical reaction. A higher value of ΔH for a given exothermal reaction means an increase in the reactivity of the ingredients present and a more complete chemical reaction. This method is a temperature gradient examination.

A DSC calorimeter is used in order to measure the difference in heat flow necessary in order to maintain the sample in question at the same temperature as an inert reference. This temperature has a linear increase of 10° C. per minute from 40° C. to 250° C. The calorimeter is an apparatus of the Setaram Company designated DSC 111.

When a chemical reaction takes place, the curve of the heat flow as a function of the temperature makes it possible to show an ehdothermicity or exothermicity peak. The integration of this peak makes it possible to calculate the enthalpy ΔH of the reaction.

II—The Examples

In all the examples 1 to 9 which follow, the same hardener is used, it being part of the group consisting of the substituted melamines. It is the product sold by American Cyanamid under the designation CYREZ® 963. This product is a complex mixture of various of the aforesaid compounds of formula (I), or oligomers of these compounds, including about 36% by weight of hexa(methoxymethyl)melamine (H3M).

Furthermore, in all the examples 1 to 9 which follow, the same novolac resin is used, it being a precondensate of resorcinol and formol. This resin is sold by Schenectady under the designation SRF 1500.

Example 1

The object of this example is to study the condensation of the novolac resin with the hardener in two compositions, one of which is in accord with the invention.

These compositions are indicated in Table 1. The contents of products used are expressed in weight per 100 parts by weight of novolac resin.

TABLE 1

| Composition No. | 1 | 2 |
|---|---|---|
| Novolac Resin | 100 | 100 |
| Hardener | 75 | 75 |
| Propionamide | 0 | 25 |

Composition 1 is therefore a control composition, and composition 2 is a composition according to the invention.

An examination by DSC is effected of the two compositions in accordance with § I-3 of Chapter I above. The curves obtained are shown in FIG. 1.

In this figure, the abscissae correspond to the temperature T (°C.), the ordinates correspond to the heat flow F (mW), the dashed-line curve C1 corresponds to composition 1, and the solid-line curve C2 corresponds to composition 2.

It is noted that the two reactions are exothermal, which is shown by two exothermicity peaks the integration of which between 80° and 240° C. gives the two enthalpies of these reactions. These enthalpies are calculated and expressed in joules per gram of composition.

It is noted that composition 2 which is in accord with the invention has a slightly later hardening reaction than the control composition 1 (shift of a few degrees) but that this condensation results in a greater exothermicity (enthalpy ΔH of the reaction: 184 J/g for composition 2 as compared with 155 J/g for composition 1); the condensation is therefore more complete in the case of the invention.

Example 2

The object of this example is to show the effect of the invention on rubber compositions not having a system permitting the cross-linking thereof.

A base composition is used the formulation of which is as follows in "pce", that is to say in parts by weight for 100 parts by weight of elastomer:

Natural rubber: 100

Carbon black N326*: 60

Novolac resin: 4

Hardener: 3

* Name in accordance with ASTM Standard D-1765.

This base composition is designated 3. To this composition 3 various compounds are added in variable proportions in "pce", as set forth in Table 2.

TABLE 2

| Composition No. | 3 | 4 | 5 | 6 | 7 | 8 |
|---|---|---|---|---|---|---|
| Propionamide | | 1 | | | | |
| Stearamide | | | 3.9 | | | |
| Benzamide | | | | 1.7 | | |
| ε-Caprolactam | | | | | 1.6 | |
| Urea | | | | | | 0.8 |

Compositions 4 to 8 are compositions in accord with the invention and composition 3 is the control composition.

These different compositions are characterized by rheometry in accordance with § I-1 a) of Chapter I above. The curves are given in FIG. 2. In that figure, the abscissae correspond to the curing time "t" (minutes) and the ordinates correspond to the torque "K" measured on the rheometer (N•m). The curves C3 to C8 correspond to compositions 3 to 8 respectively.

The maximum torque, together with the corresponding time to reach it, obtained for each composition is set forth in Table 3.

TABLE 3

| Composition No. | 3 | 4 | 5 | 6 | 7 | 8 |
|---|---|---|---|---|---|---|
| Maximum Torque (Newton · meter) | 2.94 | 4.86 | 5.08 | 6.10 | 5.31 | 4.52 |
| Time (min) | >60 | 10 | 30 | 15 | 20 | 60 |

This example shows that compositions 4 to 8 which are in accord with the invention have a resin condensation efficiency substantially greater than in the case of the control composition 3. This is shown by a higher maximum torque. Furthermore, the speed of condensation is higher for the compositions according to the invention, since the time by the end of which the maximum torque is obtained is less.

Example 3

In this example, the application of the invention to sulfur-vulcanizing rubber compositions is studied.

A base composition is prepared having the following formulation in "pce":

Natural rubber: 100
Carbon black N326: 60
Zinc oxide: 7
Stearic acid: 1
Novolac resin: 4
Antioxidant: 1
Sulfur: 4
Vulcanization accelerator: 0.8
Hardener: 3

In this formulation:

the antioxidant is N-1,3-dimethylbutyl-N'-phenyl-para-phenylenediamine;

the vulcanization accelerator is N-oxydiethylene-2-benzothiazylsulfenamide.

Various compounds are added to this composition; the nature and the amount in "pce" of these compounds in the compositions thus obtained being given in Table 4.

Composition 9 consists of the base mixture.

TABLE 4

| Composition No. | 9 | 10 | 11 | 12 | 13 | 14 |
|---|---|---|---|---|---|---|
| Propionamide |  | 1 |  |  |  |  |
| Stearamide |  |  | 3.9 |  |  |  |
| Benzamide |  |  |  | 1.7 |  |  |
| ε-Caprolactam |  |  |  |  | 1.6 |  |
| Urea |  |  |  |  |  | 0.8 |

Compositions 10 to 14 are compositions in accordance with the invention, composition 9 being the control composition.

These compositions are characterized by rheometry in accordance with § I-1b) of Chapter I above. The rheograms obtained are given in FIG. 3. In that figure, the abscissae and the ordinates have the same meaning as in the case of FIG. 2, curves C9 to C14 corresponding to compositions 9 to 14 respectively.

For each of these compositions, Table 5 sets forth the values of ts(0.2), $t_{99}$, CRI, M10, M100, M300, which are determined in accordance with § I-1 b) and § I-2 of Chapter I.

ts(0.2), expressed in minutes, is a descriptor of the starting time of the stiffening; $t_{99}$, expressed in minutes, is a descriptor of the end of the stiffening, CRI, expressed in minutes$^{-1}$, is an index of the speed of stiffening.

TABLE 5

| Composition No. | 9 | 10 | 11 | 12 | 13 | 14 |
|---|---|---|---|---|---|---|
| ts (0.2) (min) | 1.2 | 1.2 | 2 | 2 | 1 | 1.2 |
| $t_{99}$ (min) | 56 | 30 | 27 | 29 | 30 | 33 |
| CRI (min$^{-1}$) | 1.82 | 3.47 | 4.00 | 3.70 | 3.45 | 3.14 |
| M10 (MPa) | 0.93 | 1.26 | 1.65 | 1.40 | 1.42 | 1.55 |
| M100 (MPa) | 3.20 | 3.76 | 4.18 | 3.87 | 4.22 | 4.82 |
| M300 (MPa) | 9.87 | 10.98 | 11.85 | 10.83 | 12.0 | 13.59 |

As in the preceding examples, it is noted that the invention permits a greater stiffening of the compositions than in the case of the control composition. There is also noted a net acceleration of the stiffening kinetics in the case of the invention. Furthermore, the mechanical properties are substantially improved as a result of the invention with respect to the stresses M10, M100 and M300, the improvement varying from 30 to 80% for M10 and from 20 to 50% for M100.

Example 4

This example shows the interest of the invention when the content of novolac resin in a sulfur-vulcanizing rubber composition capable of adhering to a metal reinforcement is varied.

A base composition having the following formulation in "pce" is used;

Natural rubber: 100
Carbon black N326: 60
Zinc oxide: 7
Stearic acid: 1
Antioxidant: 1
Sulfur: 4
Vulcanization accelerator: 0.8
Cobalt salt: 1

In this composition:

the antioxidant and the vulcanization accelerator are the same as in Example 3;

the cobalt salt is cobalt naphthenate.

The novolac resin, the hardener and possibly propionamide are added to this composition. The compositions shown in Table 6 (proportions in "pce") are thus obtained.

TABLE 6

| Composition No. | 15 | 16 | 17 | 18 |
|---|---|---|---|---|
| Novolac resin | 4 | 4 | 3 | 3 |
| Hardener | 3 | 3 | 2.25 | 2.25 |
| Propionamide |  | 2 | 1.5 | 1 |

Compositions 16 to 18 are compositions in accordance with the invention and composition 15 is a control composition.

Figure 4:
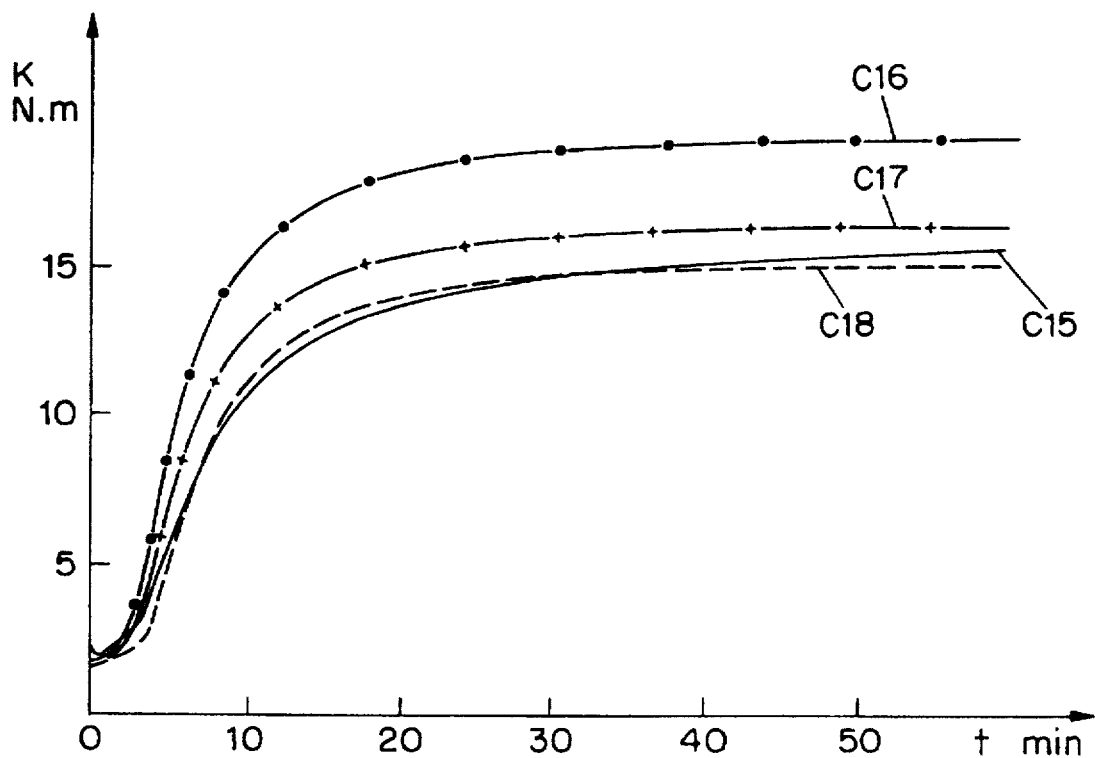

The rheograms of compositions 15 to 18 are shown in FIG. 4. In that figure, the abscissae and the ordinates have the same meaning as in FIG. 2, the curves C15 to C18 corresponding to compositions 15 to 18 respectively.

Table 7 shows the rheometric characteristics obtained and Table 8 gives the mechanical properties, after tensile tests, of the compositions after curing.

TABLE 7

| Composition No. | 15 | 16 | 17 | 18 |
| --- | --- | --- | --- | --- |
| ts (0.2) (min) | 1.5 | 2 | 2 | 3 |
| t$_{99}$ (min) | 48 | 26 | 25 | 25 |
| CRI (min$^{-1}$) | 2.15 | 4.17 | 4.35 | 4.54 |

TABLE 8

| Composition No. | 15 | 16 | 17 | 18 |
| --- | --- | --- | --- | --- |
| M10 (MPa) | 1.23 | 1.84 | 1.38 | 1.29 |
| M100 (MPa) | 3.80 | 5.03 | 4.45 | 4.17 |
| M300 (MPa) | 10.20 | 12.66 | 12.00 | 11.55 |
| Elongation at break (%) | 350 | 330 | 380 | 370 |
| Stress at break (MPa) | 17.4 | 18.7 | 20.5 | 19.0 |

FIG. 4 and Tables 7 and 8 permit the following findings:

- Curves C15 and C18 are close to each other, that is to say the stiffening performances are similar although the content of novolac resin in composition 18 in accordance with the invention is definitely less than that of the control composition 15. Composition 18 gives a time t$_{99}$ which is definitely less than for composition 15 and a stiffening rate index CRI which is definitely greater than for composition 15.
- Curves C16 and C17 show an increase in the stiffening rate and yield, although compositions 16 and 17 contain the same amount of novolac resin as the control composition 15, or a smaller amount.
- As compared with the control composition 15, an increase in the M10, M100, M300 modules and an increase in the stress at break can be noted in the case of the compositions in accord with the invention. The elongation at break has values which are close to each other for all these compositions.

The invention therefore makes it possible to decrease the amount of novolac resin in the compositions while retaining mechanical properties which are at least as good as in the compositions not in accord with the invention.

Example 5

This example makes it possible to compare a composition in accord with the invention with compositions not in accord with the invention, possibly containing vulcanization accelerators without

group, all these compositions being without a rubber cross-linking agent.

The following base Composition (proportions in "pce") is used:

Natural rubber: 100
Carbon black N326: 60
Novolac resin: 4
Hardener: 3

To this base composition, vulcanization accelerators in accordance with Table 9 are added (proportions in "pce").

TABLE 9

| Composition No. | 19 | 20 | 21 | 22 |
| --- | --- | --- | --- | --- |
| DPG (*) | | 1 | | |
| DOTG (**) | | | 1 | |
| Propionamide | | | | 1 |

\* diphenylguanidine
\*\* di-o-tolylguanidine

There are thus obtained the four compositions 19 to 22, only composition 22 being in accord with the invention, and composition 19 being formed of the base composition.

Figure 2:
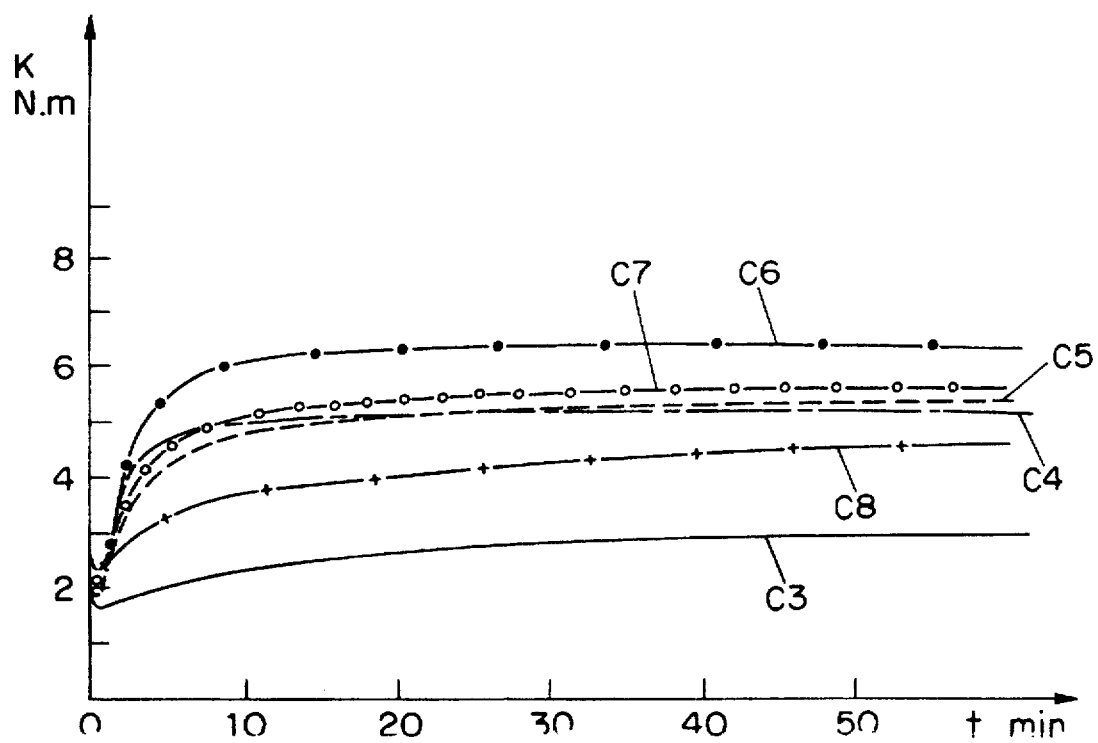
FIGS. 2 to 9 show rheometric curves for rubber compositions according to the invention and not according to the invention.
Figure 3:
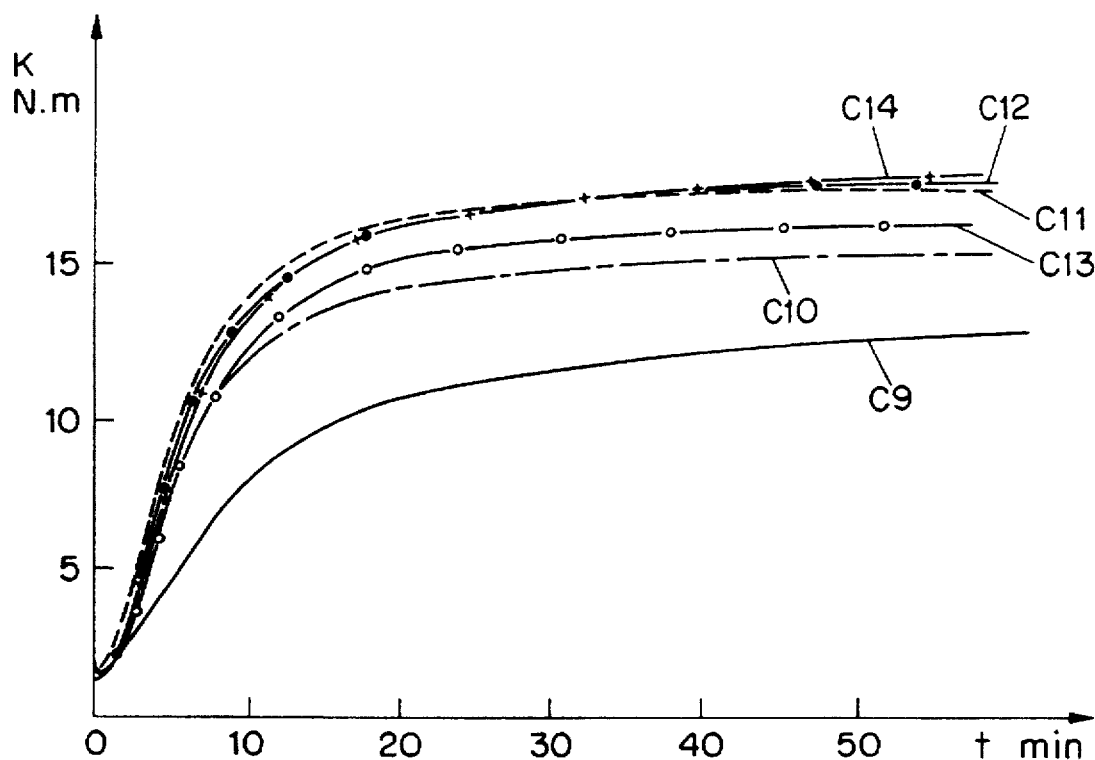
Figure 5:
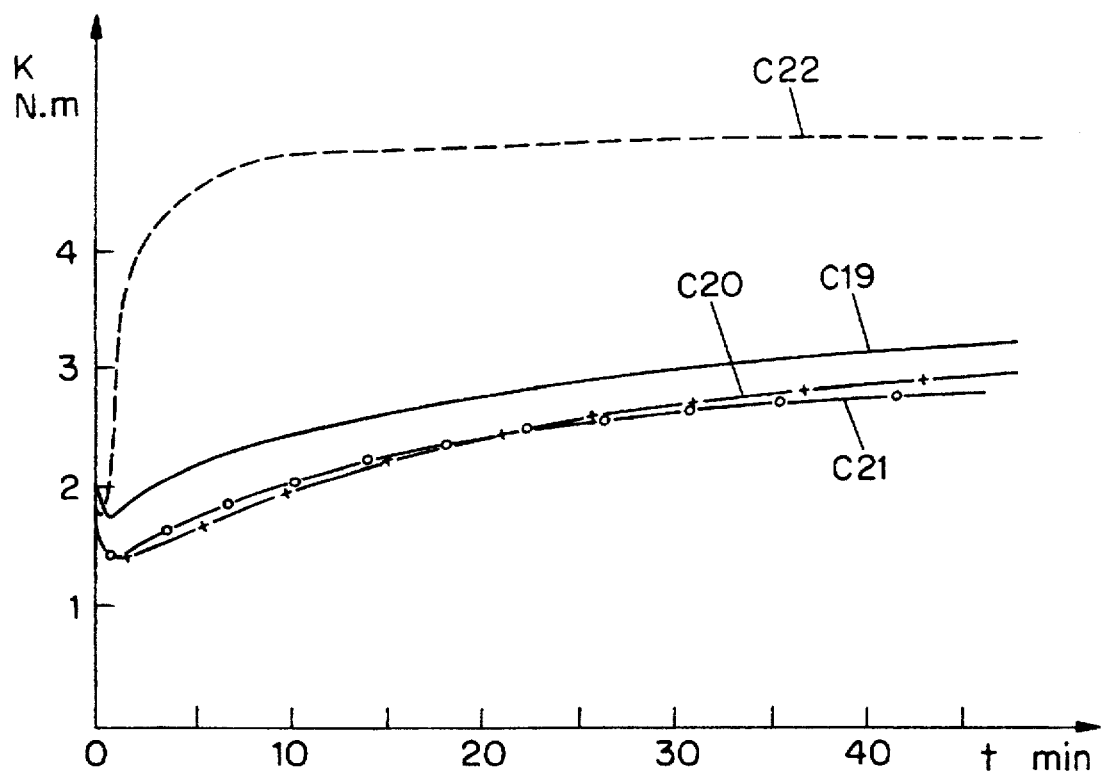

The rheograms corresponding to these compositions are given in FIG. 5, in which the abscissae and the ordinates have the same meaning as in FIG. 2, the curves C19 to C22 corresponding to compositions 19 to 22 respectively.

The rheometric torques measured after 60 minutes at 150° C. (in newton•meter) are given in Table 10.

TABLE 10

| Composition No. | 19 | 20 | 21 | 22 |
| --- | --- | --- | --- | --- |
| Rheometric torque at 60 minutes (newton · meter) | 2.94 | 2.41 | 2.25 | 4.86 |

From FIG. 5 it can be noted that composition 22 which is in accord with the invention has a rate of condensation of the resin which is much higher than the other compositions, and Table 10 shows that the rheometric torque, and therefore the condensation yield of the resin, is also greater for this composition than for the others. It is also noted that compositions 20 and 21, which are not in accord with the invention but contain vulcanization accelerators, have rates of condensation of the resin which are lower than in the case of the control composition 19, and that the rheometric torque of these compositions 20 and 21 is also less than in the case of the control composition 19.

Guanidines are known in the art in order to activate the vulcanization by sulfur of diene elastomers in the same way as, for instance, the amides, as described in particular in the article entitled "Relationship between constitution and action of accelerators" by Th. Kempermann, International Polymer Science and Technology, Vol. 5, No. 5, 1978, pp. T/34–T/42.

It is therefore surprising to note from Example 5 that the guanidines of compositions 20, 21 do not have the positive effects of the propionamide of composition 22 on the speed and yield of condensation of the novolac resin.

Example 6

This examples makes it possible to show the application of the invention to compositions using a rubber cross-linking agent other than sulfur. The compositions in accordance with Table 11 are prepared (proportions in "pce").

TABLE 11

| Composition No. | 23 | 24 | 25 | 26 |
| --- | --- | --- | --- | --- |
| Natural rubber | 100 | 100 | 100 | 100 |
| Carbon black N326 | 60 | 60 | 60 | 60 |
| Novolac resin | | | 4 | 4 |
| Dicumyl peroxide | 1.4 | 1.4 | 1.4 | 1.4 |

TABLE 11-continued

| Composition No. | 23 | 24 | 25 | 26 |
|---|---|---|---|---|
| Propionamide |  | 2 |  | 2 |
| Hardener |  |  | 3 | 3 |

The dicumyl peroxide is the cross-linking agent for the rubber. Only composition 26 is in accord with the invention; compositions 24, 25 contain at least one of the components of the invention but not all of them; composition 23 is the control composition.

Figure 6:
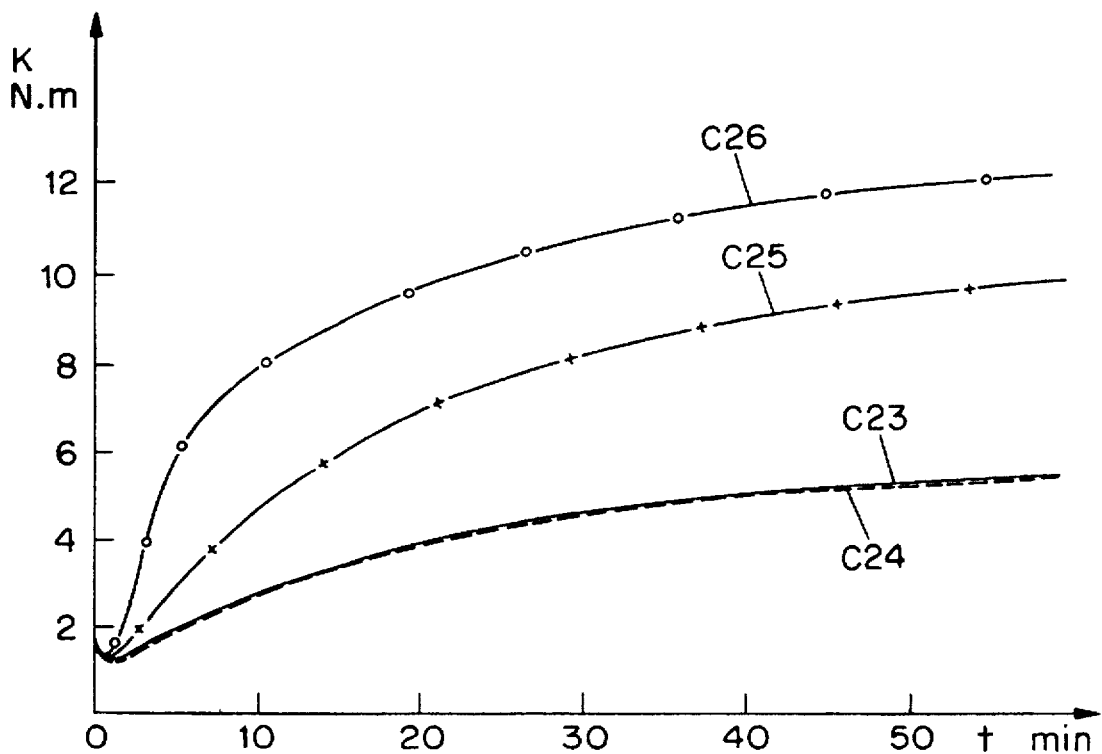

The rheograms corresponding to these compositions are given in FIG. 6, in which the abscissae and ordinates have the same meaning as in FIG. 2, the curves C23 to C26 corresponding to the compositions 23 to 26 respectively.

The rheometric torques (newton•meter) determined after 60 minutes at 150° C. are given in Table 12.

TABLE 12

| Composition No. | 23 | 24 | 25 | 26 |
|---|---|---|---|---|
| Rheometric torque at 60 minutes (newton · meter) | 5.42 | 5.42 | 9.94 | 12.31 |

The curves of FIG. 6 and Table 12 show that the invention (composition 26) makes it possible to obtain far better stiffening than in the case of the compositions not in accord with the invention.

Example 7

The object of this example is to show that the invention permits a stiffening by migration of at least one of the products of the invention [novolac resins, hardeners, compounds b)] between two rubber compositions in contact.

The following compositions are prepared (proportions in "pce"):

Natural rubber: 100
Carbon black N326: 60
Zinc oxide: 7
Stearic acid: 0.5
Antioxidant: 1
Sulfur: 4
Vulcanization accelerator: 0.8
Cobalt salt: 1
Novolac resin: See Table 13
Hardener: See Table 13
Propionamide: See Table 13

TABLE 13

| Composition No. | 27 | 28 | 29 | 30 |
|---|---|---|---|---|
| Novolac resin | 0 | 4 | 0 | 0 |
| Hardener | 0 | 0 | 3 | 3 |
| Propionamide | 0 | 0 | 0 | 1 |

The antioxidant, the vulcanization accelerator and the cobalt salt are the same as in Example 4.

None of these initial compositions is in accord with the invention, composition 27 being the control composition.

Five samples are then prepared, each obtained in the following manner:

Two plates each having a thickness of 2.5 mm, a width of 100 mm, and a length of 250 mm are placed one on top of the other. There is thus obtained a slab of a thickness of 5 mm which is set aside under normal conditions (23°±2° C., 50±5% relative humidity, atmospheric pressure) for 24 hours before Curing it for 60 minutes at 150° C.

The samples thus produced consist of the following compositions:

Sample No. 1: compositions 27 and 28,
Sample No. 2: compositions 27 and 29,
Sample No. 3: compositions 27 and 30,
Sample No. 4: compositions 28 and 29,
Sample No. 5: compositions 28 and 30.

After curing, the M10 stress (in accordance with Section 2 of Chapter I) of the following compositions is determined, the sampling in each sample being effected 1 mm from the interface between the two compositions:

Sample No. 1: composition 28,
Sample No. 2: composition 29,
Sample No. 3: composition 30,
Sample No. 4: composition 29,
Sample No. 5: composition 30.

The results are given in Table 14.

TABLE 14

| Sample No. | 1 | 2 | 3 | 4 | 5 |
|---|---|---|---|---|---|
| Constitution of the samples |  |  |  |  |  |
| Composition No. | 27 | 27 | 27 | 28 | 28 |
| Composition No. | 28 | 29 | 30 | 29 | 30 |
| Composition tested, No. | 28 | 29 | 30 | 29 | 30 |
| M10 (MPa) | 0.95 | 1.03 | 1.18 | 1.25 | 1.45 |

The variations in the values of M10 show that in the case of samples 4 and 5, a migration of novolac resin took place from composition 28 towards composition 29 (in the case of sample 4) and from composition 28 towards composition 30 (in the case of sample 5). Composition 29 of sample No. 4 is not in accord with the invention, after migration of the resin, since it does not contain propionamide. On the other hand, composition 30 of sample 5, after migration of the resin coming from composition 28, becomes a composition in accord with the invention since it then contains the three components of the invention, and it has an M10 stress greater than that of sample 4.

It is thus possible to use the invention by causing the migration of at least one of the three components of the invention, for instance a novolac resin in a composition which initially did not contain it, or contained only a small amount of it, but which contained the other two components of the invention [hardener and compound b)], which thus makes it possible to adjust the stiffness, after curing, of a composition as a function of the content of novolac resin in one or more other compositions in contact with the said composition to be stiffened. This technique can be used, for instance, in order to modulate the stiffness of the rubber mixes at different places of a tire upon its manufacture.

The result would be the same if the migration took place on the hardener, and/or on the compound b), and/or on the reagent or reagents capable of forming the compound b).

Example 8

The object of this example is to show the advantage provided by the invention upon the thermo-oxidative aging of a rubber composition.

Compositions having the following formulations (values in "pce") are prepared:

Natural rubber: 100

Carbon black N326: 60

Zinc oxide: 7

Stearic acid: 0.5

Novolac resin: Variable (see Table 15)

Antioxidant (*): 1

Sulfur: Variable (see Table 15)

Vulcanization accelerator (**): 0.8

Hardener: Variable (see Table 15)

Cobalt naphthenate: 1

ε-Caprolactam: Variable (see Table 15)

(*) N-1,3-dimethylbutyl-N'-phenyl-para-phenylenediamine
(**) N-oxydiethylene-2-benzothiazylsulfenamide Table 15 shows the different values (in "pce") of novolac resin, sulfur, hardener and ε-caprolactam.

TABLE 15

| Composition No. | 31 | 32 | 33 |
|---|---|---|---|
| Novolac resin | 4 | 4 | 3 |
| Hardener | 3 | 3 | 2.25 |
| ε-Caprolactam | 0 | 3.1 | 2.3 |
| Sulfur | 4 | 2.5 | 3 |

Compositions 32, 33 are in accord with the invention; composition 31 serves as control.

The following characteristics are determined after curing: M10, M100, stress at break, and elongation at break, in accordance with Section 2 of Chapter I, but with the following differences:

Initial Condition After Curing

The samples are cured at 150° C., for variable periods of time. The determinations are made on the cured samples.

The curing times and the values obtained (initial properties) for these determinations are given in Table 16.

TABLE 16

| INITIAL PROPERTIES | | | |
|---|---|---|---|
| Composition No. | 31 | 32 | 33 |
| Curing time (min) | 75 | 40 | 40 |
| M10 (MPa) | 1.26 | 1.51 | 1.33 |
| M100 (MPa) | 3.85 | 3.84 | 3.95 |
| Elongation at break (%) | 300 | 360 | 390 |
| Stress at break (MPa) | 16.9 | 20.8 | 21.9 |

Condition After Thermo-Oxidative Aging

The samples are cured in a manner identical to those previously used (curing at 150° C. with curing time indicated in Table 16), but the determinations are carried out after an aging of these cured samples in air at 75° C. for 14 days.

The values obtained as well as the variations (in %) as compared with the initial values of Table 16 for M10 and M100 are given in Table 17.

TABLE 17

| PROPERTIES AFTER AGING IN AIR AT 75° C. FOR 14 DAYS | | | |
|---|---|---|---|
| Composition No. | 31 | 32 | 33 |
| M10 (MPa) | 1.7 | 1.78 | 1.75 |
| % change | 35 | 18 | 31 |
| M100 (MPa) | 6.7 | 5.6 | 6.3 |
| % change | 74 | 46 | 59 |
| Elongation at break (%) | 120 | 170 | 160 |
| Stress at break (MPa) | 9.6 | 12.7 | 13.3 |

A study of Tables 16 and 17 permits the following findings:

Initial Condition

The invention makes it possible to decrease the sulfur content while making it possible to reach values of M10 or M100 close or very close to those of the control composition; in other words, the stiffnesses obtained are comparable.

It is furthermore noted that the elongations at break and the stresses at break are in all cases greater in the case of the invention.

Condition After Aging

The invention makes it possible very substantially to decrease the variations (in %) of M10 and M100 as compared with the control composition, that is to say the compositions in accordance with the invention are much more stable in stiffness than the control composition during this thermo-oxidative aging. Furthermore, the values of the elongations at break and the stresses at break are again substantially greater in the case of the invention than those of the control composition.

Example 9

The object of this example is to show that rubbers other than natural rubber can be used in the invention.

The same base composition is used as that of Example 2, with the difference that, instead of 100 parts by weight of natural rubber, 100 parts by weight of SBR rubber (butadiene-styrene copolymer containing 25% styrene) are used.

Starting from this base composition, referred to as composition 34, there is obtained composition 35 in accordance with the invention which contains 2 pce of stearamide.

These two compositions are characterized by rheometry, in accordance with § I-1 a) of Chapter I above.

Figure 7:
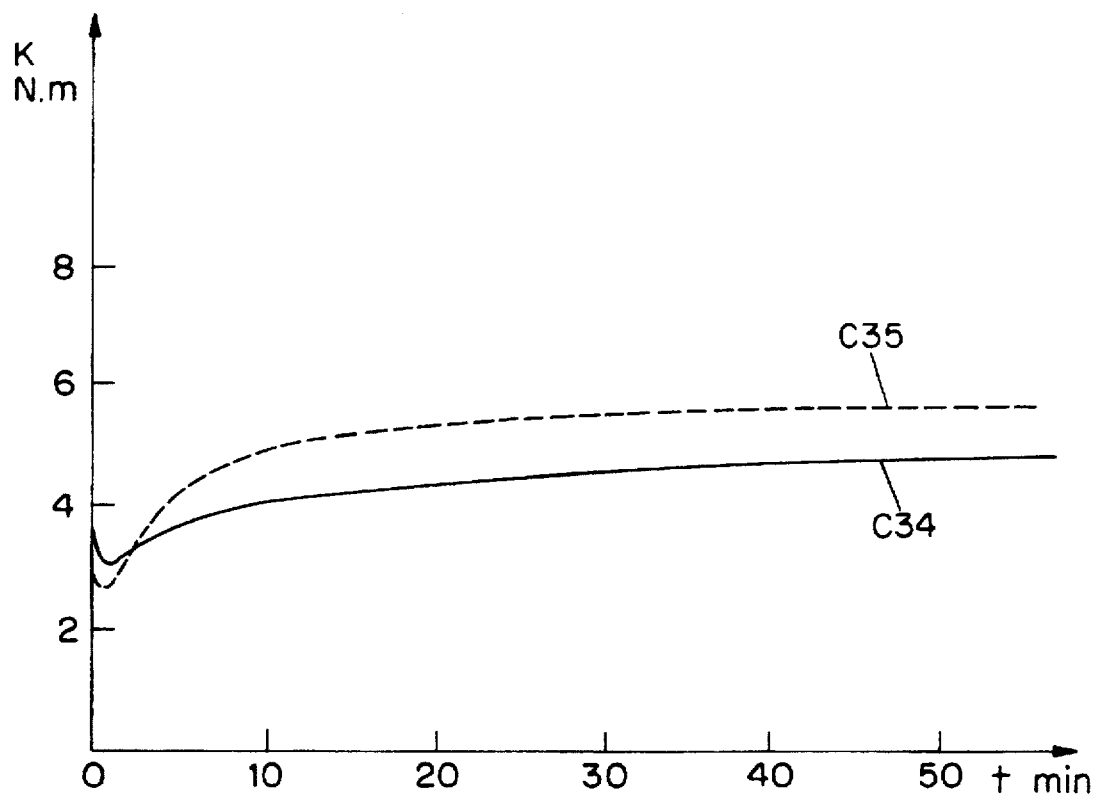

The resultant curves C34 for composition 34 and C35 for composition 35 are given in FIG. 7, the abscissae and ordinates having the same meaning as in FIG. 2. These curves show that the composition 35 has a resin condensation yield and rate which are definitely higher than the control composition 34.

Example 10

The object of this example is to show that novolac resins other than resin SRF 1500 and hardeners other than CYREZ® 963 can be used in the invention.

The compositions given in the following Table 18 are used (values in "pce").

TABLE 18

| Composition No. | 36 | 37 | 38 | 39 |
|---|---|---|---|---|
| Natural rubber | 100 | 100 | 100 | 100 |
| Carbon black N326 | 60 | 60 | 60 | 60 |
| Novolac resin SRF 1500 | 4 | 4 | | |
| Novolac resin Penacolite ® B20 | | | 4 | 4 |
| Hardener CYREZ ® 963 | | | 4 | 4 |
| Hardener COHEDUR ® A | 3 | 3 | | |
| Propionamide | 0 | 1 | 0 | 1 |

The resin SRF 1500 and the hardener CYREZ® 963 are identical to those used in the preceding examples. The novolac resin Penacolite® B20 which is sold by Koppers is a precondensate of modified-resorcinol/formol.

The hardener COHEDUR® A, which is a Bayer product, is a complex mixture of various aforementioned compounds of formula (I) or oligomers of these compounds, including about 20% by weight of hexa(methoxymethyl)melamine (H3M). Compositions 37 and 39 are in accord with the invention and compositions 36 and 38 are control compositions. These compositions are characterized by rheometry in accordance with § I-1 a) of Chapter I above.

Figure 8:
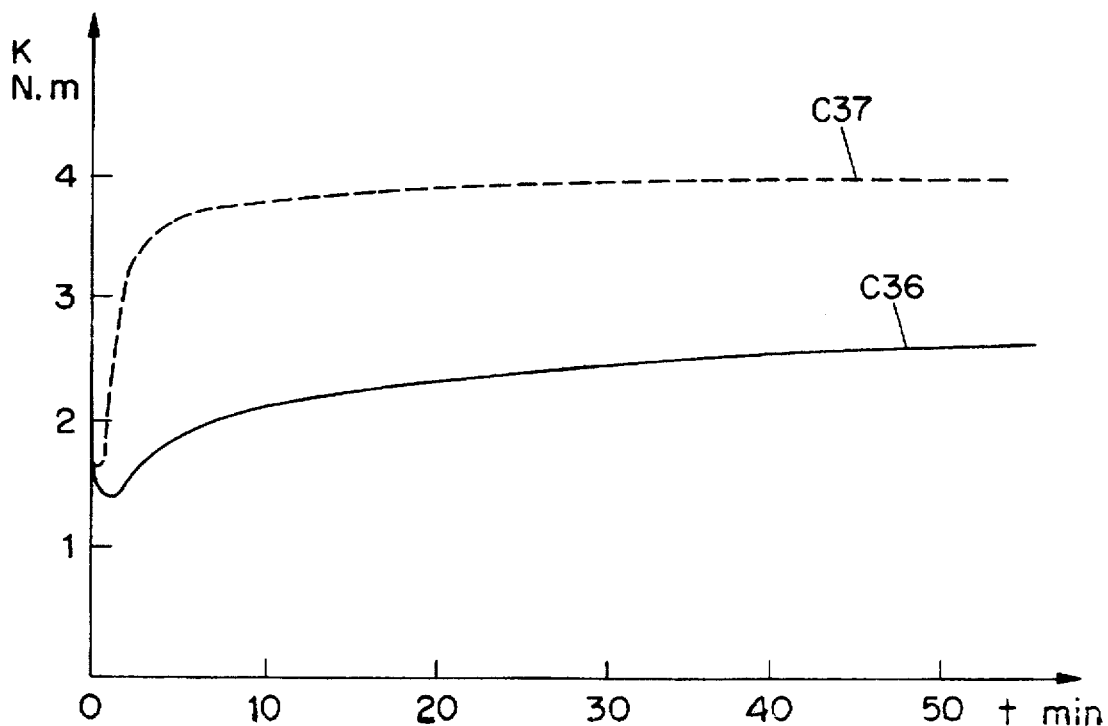
Figure 9:
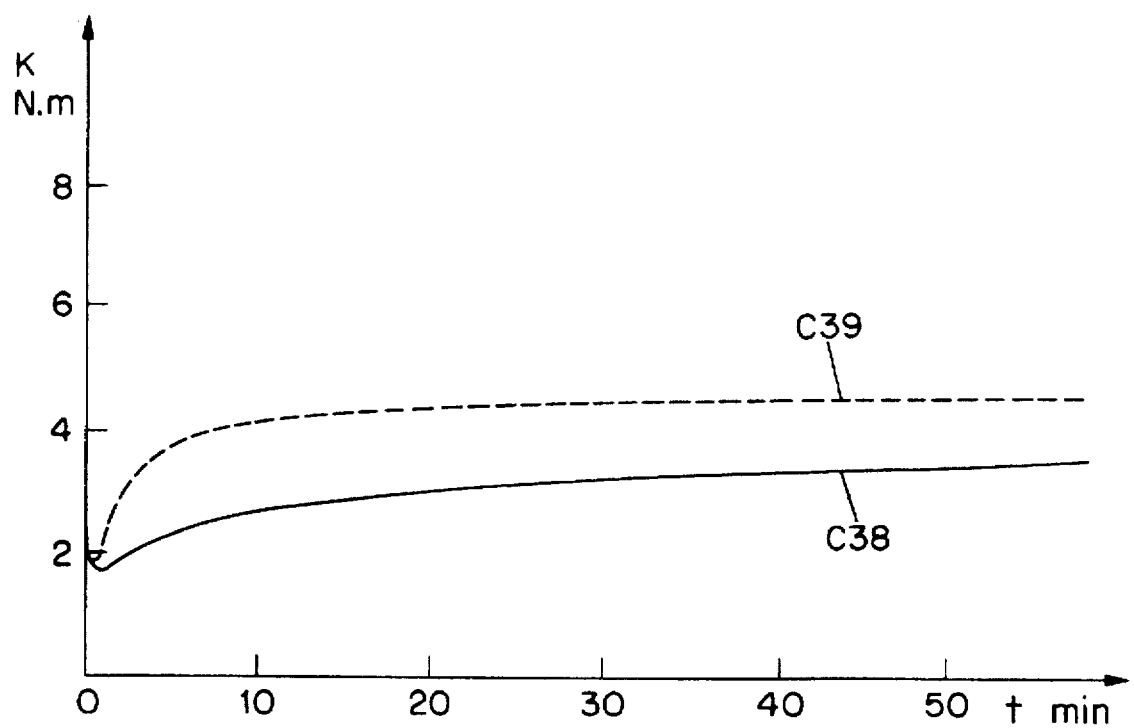

FIG. 8 shows the curves C36 and C37 corresponding to compositions 36 and 37 respectively, and FIG. 9 shows the Curves C38 and C39 corresponding to compositions 38 and 39 respectively. The abscissae and ordinates in these figures have the same meaning as in FIG. 2.

Table 19 shows the maximum torques obtained in this manner (in N•m) as well as the time (in minutes) by the end of which the maxima are reached.

TABLE 19

| Composition No. | 36 | 37 | 38 | 39 |
|---|---|---|---|---|
| Maximum torque (N · m) | 2.6 | 3.9 | 3.5 | 4.4 |
| Time (minutes) | >60 | 30 | >60 | 20 |

These curves C36 to C39 and Table 19 show that compositions 37 and 39 in accord with the invention have a definitely higher yield and rate of condensation of the resins than the control compositions 36 and 38.

The composition in accord with the invention preferably has the following properties, before hardening:

for 100 parts by weight of the novolac resin or the total novolac resins, the amount of hardener or of all of the hardeners is between 0.5 and 200 parts by weight, and more particularly between 50 and 100 parts by weight;

for 100 parts by weight of the novolac resin or the total novolac resins, the content of compound b) (comprising at least one

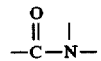

group) or the total of compounds b) is between 0.5 and 200 parts by weight, and more particularly between 10 and 100 parts by weight, the compound or compounds b) being present in the composition or capable of appearing in the composition after reaction of the reagent or reagents giving this or these compounds b).

In the event that the composition in accordance with the invention comprises one or more rubbers, it has preferably the following properties:

for 100 parts by weight of rubber or of all the rubbers, the amount of the novolac resin or the total novolac resins is between 1 and 50 parts by weight, and more particularly between 2 and 20 parts by weight.

Summarizing, the invention makes it possible unexpectedly to obtain the following advantages:

mixes of greater rigidity than in the known mixes can be obtained for the same content of novolac resin;

the amount of novolac resin and/or the amount of sulfur can be decreased for the same rigidity as the known mixes; this makes it possible, among other things, to decrease the cost;

the speed of the stiffening reaction can be faster than in the known mixes, which also makes it possible to decrease the cost, due to the decrease in the curing times;

the invention makes it possible to use as hardener derivatives of melamine in replacement of HMTA while retaining good kinetic properties for the stiffening and good mechanical properties, while eliminating the source of ammonia and therefore the drawbacks inherent therein, for instance failure of the bond between a metal reinforcement and the rubber;

the invention makes it possible to have better stability in rigidity after thermo-oxidative aging due to the decrease in the amount of sulfur as compared with the known compositions, while retaining mechanical properties close to or superior to those of the known compositions.

The problem of the behavior upon the thermo-oxidative aging is particularly important for tires which are subject to extensive heat build-up in contact with the air, particularly tires of heavy vehicles, construction vehicles, and aircraft.

Of course, the invention is not limited to the examples indicated above.

We claim:

1. A process for making a tire comprising the steps of mixing at least one novolac resin with:

a) at least one hardener selected from the group consisting of the substituted melamines, said hardener having the following general formula:

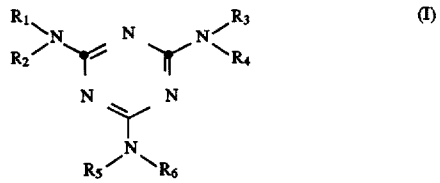

(I)

in which $R_1$, $R_2$, $R_3$, $R_4$, $R_5$, and $R_6$, which may be identical or different, are each selected from the group consisting of —H, —CH$_2$OH, —CH$_2$OCH$_3$, and —CH$_2$OCH$_2$OCH$_3$, at least one of the $R_1$ to $R_6$ being other than hydrogen;

b) at least one compound represented by one or more of the following general formulas:

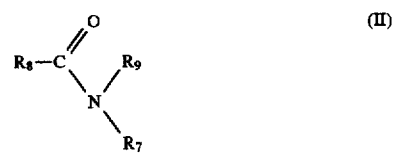

(II)

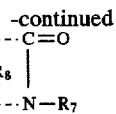  (III)

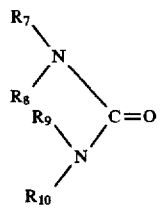  (IV)

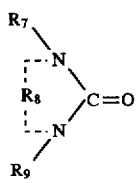  (V)

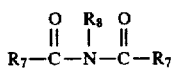  (VI)

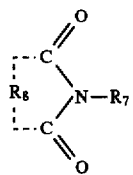  (VII)

in which $R_7$, $R_8$, $R_9$, and $R_{10}$ are each selected from the group formed of —H, and the saturated or unsaturated aliphatic, cyclic or aromatic hydrocarbon radicals, in which connection $R_7$, $R_8$, $R_9$, and $R_{10}$ may be identical or different, with the provisio that $R_8$ is other than —H in formulas (III), (V) and (VII), and/or at least one reagent capable of giving such a compound under the action of heat; reinforcing a rubber composition with said novolac resin so as to obtain a hardened rubber preparation and producing a tire from said hardened rubber preparation.

2. The process according to claim 1, wherein said rubber composition comprises at least one rubber selected from the group consisting of natural rubber, polyisoprene, polybutadiene, polychloroprene, polyisobutylene, styrene-butadiene copolymer rubber, acrylonitrile-butadiene-styrene copolymer rubber and ethylene-propylene copolymer rubber or combinations thereof.

3. The process according to claim 2, wherein the content of novolac resin or total of novolac resins is between 1 and 50 parts by weight to 100 parts by weight of the rubber or total of rubbers.

4. The process according to claim 3, wherein the content of novolac resin or total of novolac resins is between 2 and 20 parts by weight to 100 parts by weight of the rubber or total of rubbers.

5. The process according to claim 2, wherein the mixture comprises at least one agent causing cross-linking of the rubber or rubbers, and wherein the stiffening of the mixture is effected by heat as a result of both hardening of the resin or resins and cross-linking of the rubbers or rubbers.

6. The process according to claim 5, wherein said agent is sulfur.

7. The process according to claim 5, wherein said agent is a peroxide.

8. The hardenable composition according to claim 1, wherein the mixture further comprises at least one rubber.

9. The hardenable composition according to claim 8, wherein the content of novolac resin or total of novolac resins is between 1 and 50 parts by weight to 100 parts by weight of the rubber or total of rubbers.

10. The hardenable composition according to claim 9, wherein the content of novolac resin or total of novolac resins is between 2 and 20 parts by weight to 100 parts by weight of the rubber or total of rubbers.

11. The hardenable composition according to claim 8, wherein the mixture further comprises at least one agent capable of causing cross-linking of the rubber or rubbers.

12. The hardenable composition according to claim 11, wherein said agent is sulfur.

13. The hardenable composition according to claim 11, wherein said agent is a peroxide.

* * * * *